United States Patent
Billman et al.

(10) Patent No.: US 11,015,813 B2
(45) Date of Patent: May 25, 2021

(54) COOKTOP APPLIANCE WITH A GAS BURNER

(71) Applicant: Haier US Appliance Solutions, Inc., Wilmington, DE (US)

(72) Inventors: David William Billman, Louisville, KY (US); John Adam Yantis, Prospect, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 134 days.

(21) Appl. No.: 16/452,633

(22) Filed: Jun. 26, 2019

(65) Prior Publication Data
US 2020/0408413 A1 Dec. 31, 2020

(51) Int. Cl.
*F24C 3/12* (2006.01)
*G05B 11/42* (2006.01)
*F24C 3/00* (2006.01)

(52) U.S. Cl.
CPC ............ *F24C 3/124* (2013.01); *F24C 3/008* (2013.01); *F24C 3/126* (2013.01); *G05B 11/42* (2013.01)

(58) Field of Classification Search
CPC .......... F24C 3/124; F24C 3/008; F24C 3/126; G05B 11/42
See application file for complete search history.

(56) References Cited

U.S. PATENT DOCUMENTS

| | | | |
|---|---|---|---|
| 5,575,638 A * | 11/1996 | Witham | F24C 3/126 431/73 |
| 7,255,100 B2 * | 8/2007 | Repper | F23N 5/203 126/39 BA |
| 8,001,957 B2 * | 8/2011 | Clauss | F23N 1/005 126/42 |
| 9,689,569 B2 * | 6/2017 | Vie | F23N 5/203 |
| 10,092,129 B2 * | 10/2018 | Jenkins | A47J 36/321 |
| 10,528,308 B2 * | 1/2020 | Chen | G05B 19/4099 |
| 2019/0187631 A1 * | 6/2019 | Badgwell | G06N 3/08 |
| 2020/0018487 A1 * | 1/2020 | Blum | H05B 6/06 |
| 2020/0103105 A1 * | 4/2020 | Cadima | F23N 3/085 |
| 2020/0256558 A1 * | 8/2020 | Cadima | F24C 3/085 |

FOREIGN PATENT DOCUMENTS

| | | |
|---|---|---|
| CN | 108361750 A | 8/2018 |
| KR | 101871101 B1 | 7/2018 |

* cited by examiner

*Primary Examiner* — David J Laux
*Assistant Examiner* — Nikhil P Mashruwala
(74) *Attorney, Agent, or Firm* — Dority & Manning, P.A.

(57) ABSTRACT

A cooktop appliance includes a user interface, a gas burner, and a temperature sensor. A manually adjustable primary control valve is coupled to the gas burner. A secondary control valve is connected in series between the manually adjustable primary control valve and the gas burner. A controller is in communication with the secondary control valve. The controller is configured to adjust the secondary control valve in response to a user-determined set temperature, a temperature measurement from the temperature sensor, and a determined position of the manually adjustable primary control valve.

18 Claims, 4 Drawing Sheets

COOKTOP APPLIANCE WITH A GAS BURNER

FIELD OF THE INVENTION

The present subject matter relates generally to cooktop appliances with gas burner assemblies, such as gas range appliances or gas stove appliances.

BACKGROUND OF THE INVENTION

Certain cooktop appliances include gas burners for heating cooking utensils on the cooktop appliances. Some users prefer gas burners over electric heating elements due to the adjustability of gas burners. In particular, a gas burner's control valve can provide more heat outputs comparted to the discrete number of output settings available for electric heating elements. However, precisely heating a cooking utensil with a gas burner can be difficult. For example, a user may have to constantly monitor the cooking utensil and tweak the control valve to maintain a particular temperature in the cooking utensil, and such monitoring and adjustment can be tedious.

Accordingly, a cooktop appliance with features for operating a gas burner to maintain a particular temperature in a cooking utensil would be useful.

BRIEF DESCRIPTION OF THE INVENTION

Aspects and advantages of the invention will be set forth in part in the following description, or may be apparent from the description, or may be learned through practice of the invention.

In one example embodiment, a cooktop appliance includes a user interface comprising at least one user input and a display and a gas burner. A temperature sensor is configured to measure a temperature at a utensil heated by the gas burner. A manually adjustable primary control valve is coupled to the gas burner. The manually adjustable primary control valve regulates a flow of gaseous fuel to the gas burner. A secondary control valve is connected in series between the manually adjustable primary control valve and the gas burner. A controller is in communication with the temperature sensor and the secondary control valve. The controller is configured to receive a user-determined set temperature from the user interface, receive a temperature measurement from the temperature sensor, and receive a precision mode initiation signal from the user interface. The controller is further configured to determine a position of the manually adjustable primary control valve after receiving the precision mode initiation signal and determine a set of parameters of a closed-loop algorithm for operation of the gas burner corresponding to the determined position of the manually adjustable primary control valve. After determining the set of parameters, the controller is configured to input the user-determined set temperature and the temperature measurement into the closed-loop control algorithm and determine an output of the closed-loop control algorithm using the set of parameters corresponding to the determined position of the manually adjustable primary control valve. The controller is also configured to adjust operation of the gas burner by adjusting a position of the secondary control valve according to the output of the closed-loop control algorithm.

In another example embodiment, a method of operating a cooktop appliance is provided. The cooktop appliance includes a gas burner and a temperature sensor configured to measure a temperature at a utensil heated by the gas burner. The method includes receiving a user-determined set temperature from a user interface of the cooktop appliance. The user interface includes at least one user input and a display. The method also includes receiving a temperature measurement from the temperature sensor and receiving a precision mode initiation signal from the user interface. The method also includes determining a position of a manually adjustable primary control valve coupled to the gas burner to regulate a flow of gaseous fuel to the gas burner after receiving the precision mode initiation signal. The method further includes determining a set of parameters of a closed-loop algorithm for operation of the gas burner corresponding to the determined position of the manually adjustable primary control valve. The method also includes determining an output of the closed-loop control algorithm using the set of parameters corresponding to the determined position of the manually adjustable primary control valve and adjusting operation of the gas burner by adjusting a position of the secondary control valve according to the output of the closed-loop control algorithm.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
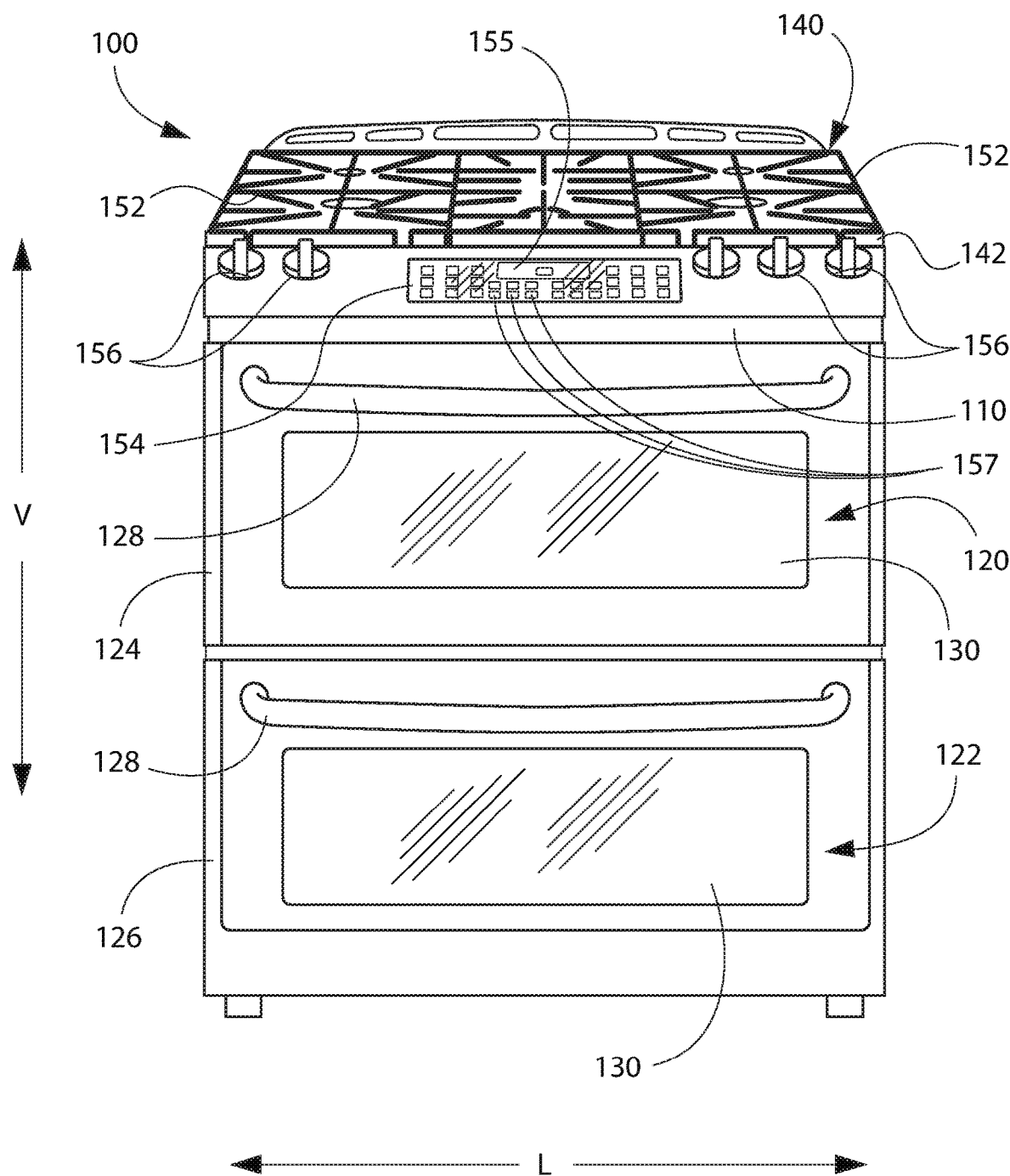
FIG. 1 provides a front, perspective view of a range appliance according to one or more example embodiments of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
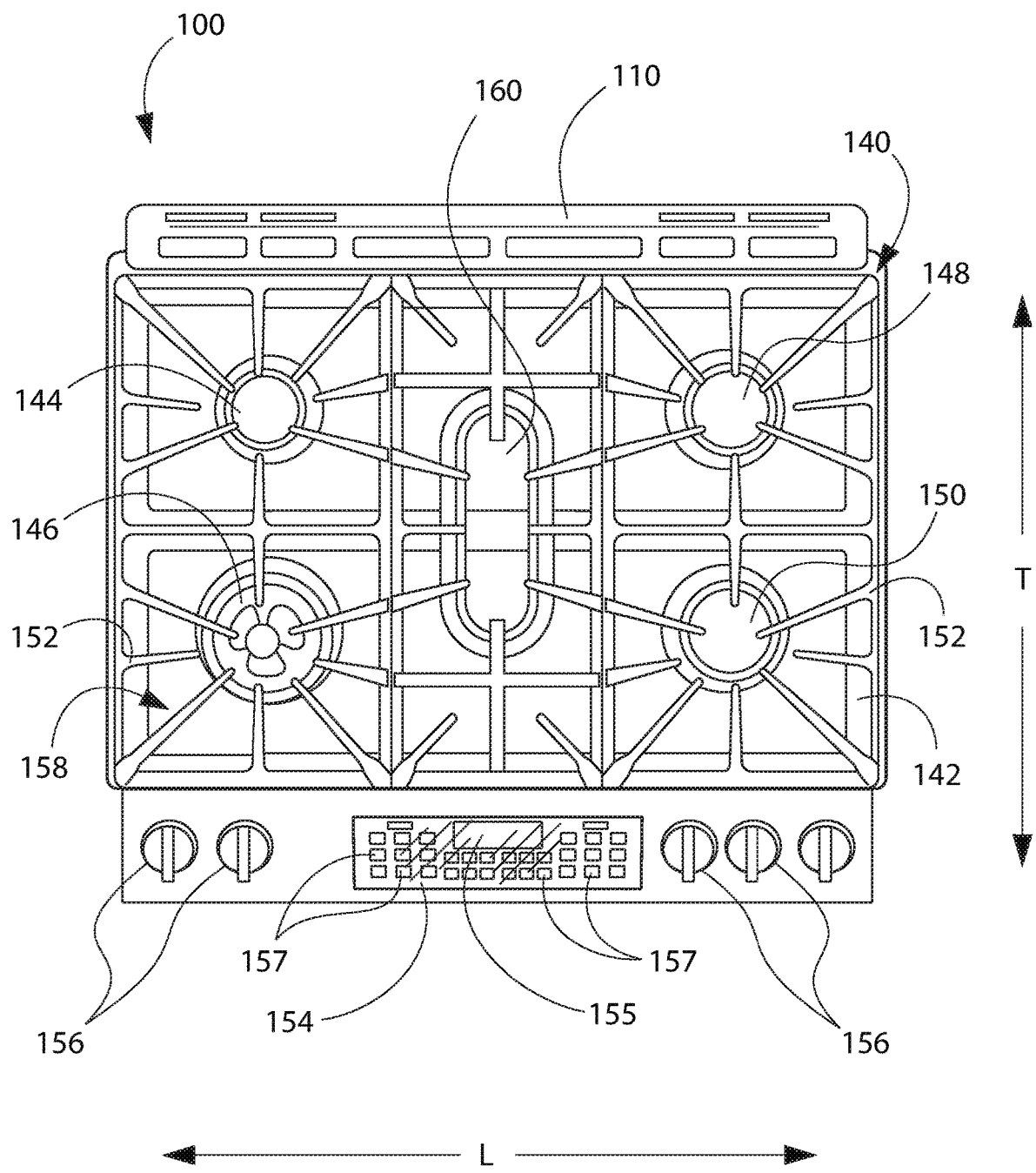
FIG. 2 provides a top, plan view of the example range appliance of FIG. 1.

FIG. 1 provides a front, perspective view of a range appliance 100 as may be employed with the present subject matter. FIG. 2 provides a top, plan view of range appliance 100. Range appliance 100 includes an insulated cabinet 110. Cabinet 110 defines an upper cooking chamber 120 and a lower cooking chamber 122. Thus, range appliance 100 is generally referred to as a double oven range appliance. As will be understood by those skilled in the art, range appliance 100 is provided by way of example only, and the present subject matter may be used in any suitable cooktop appliance, e.g., a single oven range appliance or a standalone cooktop appliance. Thus, the example embodiment shown in FIG. 1 is not intended to limit the present subject matter to any particular cooking chamber configuration or arrangement (or even the presence of a cooking chamber at all, e.g., as in the case of a standalone cooktop appliance).

Upper and lower cooking chambers 120 and 122 are configured for the receipt of one or more food items to be cooked. Range appliance 100 includes an upper door 124 and a lower door 126 rotatably attached to cabinet 110 in order to permit selective access to upper cooking chamber 120 and lower cooking chamber 122, respectively. Handles 128 are mounted to upper and lower doors 124 and 126 to assist a user with opening and closing doors 124 and 126 in order to access cooking chambers 120 and 122. As an example, a user can pull on handle 128 mounted to upper door 124 to open or close upper door 124 and access upper cooking chamber 120. Glass window panes 130 provide for viewing the contents of upper and lower cooking chambers 120 and 122 when doors 124 and 126 are closed and also assist with insulating upper and lower cooking chambers 120 and 122. Heating elements (not shown), such as electric resistance heating elements, gas burners, microwave heating elements, halogen heating elements, or suitable combinations thereof, are positioned within upper cooking chamber 120 and lower cooking chamber 122 for heating upper cooking chamber 120 and lower cooking chamber 122.

Range appliance 100 also includes a cooktop 140. Cooktop 140 is positioned at or adjacent a top portion of cabinet 110. Thus, cooktop 140 is positioned above upper and lower cooking chambers 120 and 122. Cooktop 140 includes a top panel 142. By way of example, top panel 142 may be constructed of glass, ceramics, enameled steel, and combinations thereof.

For range appliance 100, a utensil holding food and/or cooking liquids (e.g., oil, water, etc.) may be placed onto grates 152 at a location of any of burner assemblies 144, 146, 148, 150. Burner assemblies 144, 146, 148, 150 provide thermal energy to cooking utensils on grates 152. As shown in FIG. 2, burner assemblies 144, 146, 148, 150 can be configured in various sizes so as to provide e.g., for the receipt of cooking utensils (i.e., pots, pans, etc.) of various sizes and configurations and to provide different heat inputs for such cooking utensils. Grates 152 are supported on a top surface 158 of top panel 142. Range appliance 100 also includes a griddle burner 160 positioned at a middle portion of top panel 142, as may be seen in FIG. 2. A griddle may be positioned on grates 152 and heated with griddle burner 160.

A user interface panel 154 is located within convenient reach of a user of the range appliance 100. For this example embodiment, user interface panel 154 includes knobs 156 that are each associated with one of burner assemblies 144, 146, 148, 150 and griddle burner 160. Knobs 156 allow the user to activate each burner assembly and determine the amount of heat input provided by each burner assembly 144, 146, 148, 150 and griddle burner 160 to a cooking utensil located thereon. The user interface panel 154 may also include one or more inputs 157, such as buttons or a touch pad, for selecting or adjusting operation of the range appliance 100, such as for selecting or initiating a precision cooking mode, as will be described in more detail below. User interface panel 154 may also be provided with one or more graphical display devices 155 that deliver certain information to the user such as e.g., whether a particular burner assembly is activated and/or the temperature at which the burner assembly is set.

Although shown with knobs 156, it should be understood that knobs 156 and the configuration of range appliance 100 shown in FIG. 1 is provided by way of example only. More specifically, user interface panel 154 may include various input components, such as one or more of a variety of touch-type controls, electrical, mechanical or electro-mechanical input devices including rotary dials, push buttons, and touch pads. The user interface panel 154 may include other display components, such as a digital or analog display device 155, designed to provide operational feedback to a user.

Figure 3:
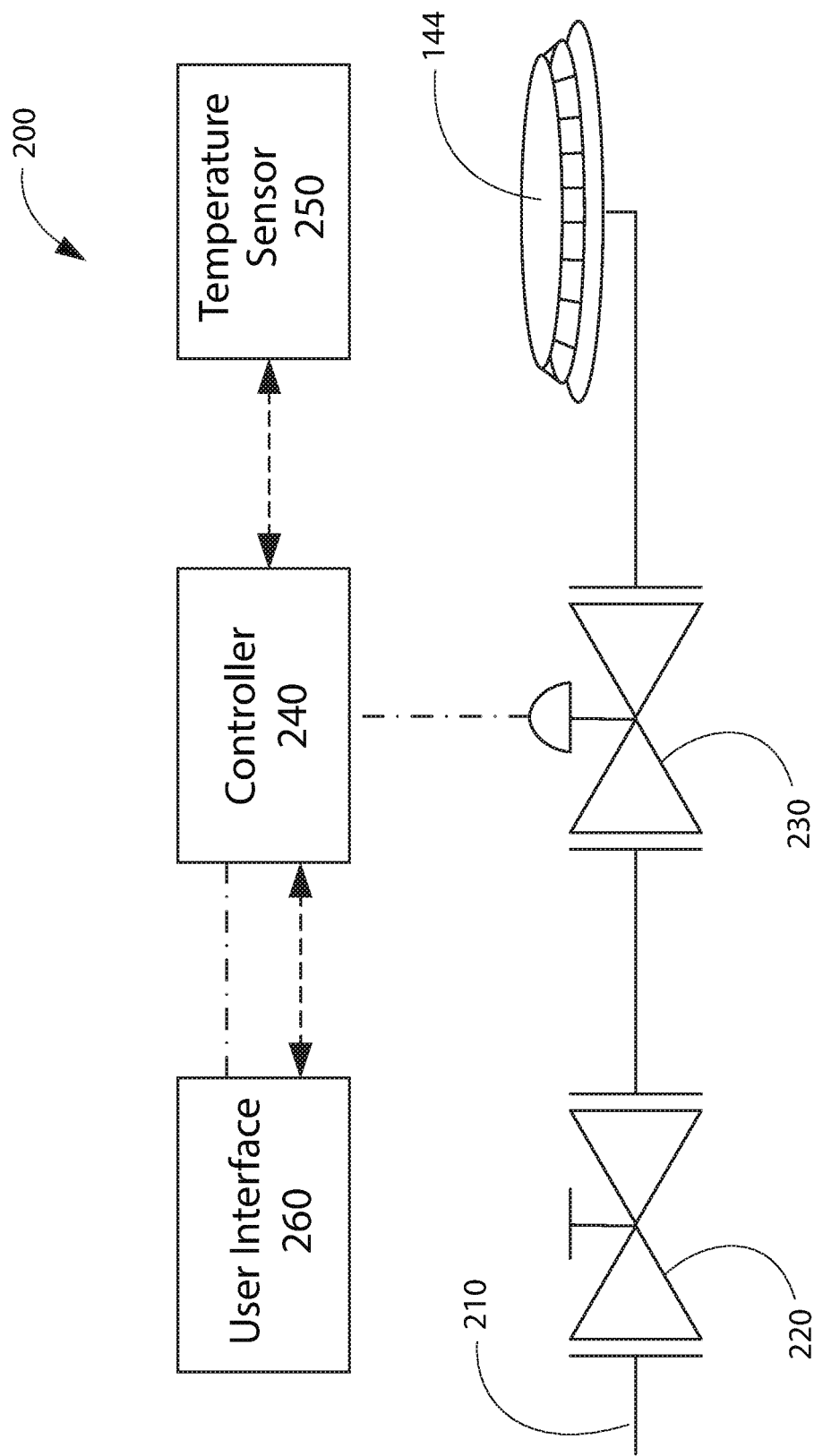
FIG. 3 is a schematic view of certain components of the example range appliance of FIG. 1.

FIG. 3 is a schematic view of certain components of range appliance 100. In particular, as shown in FIG. 3, range appliance 100 includes a fuel supply system 200. Fuel supply system 200 includes a supply line 210, a primary control valve 220 and a secondary control valve 230. Supply line 210 may be a metal tube, such as copper or aluminum tubing, that is connectable to a fuel supply. Thus, supply line 210 may receive a flow of pressurized gaseous fuel, e.g., natural gas or propane, from the fuel supply. Supply line 210 also extends to burner assembly 144 within cabinet 110 below top panel 142. Thus, the gaseous fuel may flow from the fuel supply to burner assembly 144 through supply line 210. Although not shown in FIG. 3, the other burner assemblies 146, 148, 150 may be connected to supply line 210 in a similar manner. In particular, each one of burner assemblies 146, 148, 150 may have a respective primary control valve 220 and secondary control valve 230, in certain example embodiments.

Primary control valve 220 is coupled to supply line 210 and is configured for regulating the flow of gaseous fuel through supply line 210 to burner assembly 144. In particular, primary control valve 220 may be coupled to one of knobs 156 such that primary control valve 220 is manually adjustable to regulate the flow of gaseous fuel to burner assembly 144. For example, a user may rotate the knob 156 coupled to primary control valve 220 to a high setting (sometimes stylized as "HI") in order to maximize the flow of gaseous fuel to burner assembly 144, and the user may rotate the knob 156 coupled to primary control valve 220 to a low setting (sometimes stylized as "LO") in order to minimize the flow of gaseous fuel to burner assembly 144. In addition, the user may rotate the knob 156 to a setting between the "HI" and "LO" settings to adjust the flow of gaseous fuel to burner assembly 144 between the maximum and minimum flows, or the user may rotate the knob 156 coupled to primary control valve 220 to an "OFF" setting in order to terminate the flow of gaseous fuel to burner assembly 144. Thus, it will be understood that primary control valve 220 may be a standard manual surface burner valve, in certain example embodiments.

Secondary control valve 230 is also coupled to supply line 210. However, secondary control valve 230 is connected in series between primary control valve 220 and burner assembly 144. Thus, secondary control valve 230 may be positioned downstream of primary control valve 220 on supply line 210 relative to the flow of fuel from the fuel source. In such a manner, secondary control valve 230 may further regulate the flow of gaseous fuel to burner assembly 144 after primary control valve 220. In particular, secondary control valve 230 may be operable in a precision cooking mode, e.g., utilizing a closed loop control system to regulate gaseous fuel flow to burner assembly 144, as discussed in greater detail below. Secondary control valve 230 may be a normally open valve, e.g., such that secondary control valve 230 does not interfere with gaseous fuel flow to burner assembly 144 unless the precision mode or closed loop control system is activated. Thus, primary control valve 220 alone may control gaseous fuel flow to burner assembly 144 when the closed loop control system is deactivated. In alternative example embodiments, secondary control valve 230 may be a normally closed valve.

Secondary control valve 230 may be an electronic pressure regulating valve, a motorized valve, a modulating valve, a solenoid valve, or some other variable type gas flow valve. Thus, secondary control valve 230 may be automatically adjusted to regulate the flow of gaseous fuel to burner assembly 144, e.g., rather than being manually actuated as with primary control valve 220. In particular, range appliance 100 includes a controller 240 that regulates various components of range appliance 100. Controller 240 is in operative communication with various components of range appliance 100, such as user interface 154, including the inputs 157 and display 155 thereon, secondary control valve 230, and/or a temperature sensor 250. Thus, controller 240 may adjust secondary control valve 230 in order to regulate the flow of gaseous fuel to burner assembly 144. Signals may be routed between controller 240 and the various operational components of range appliance 100. Thus, controller 240 can selectively activate and operate these various components. Various components of range appliance 100 are communicatively coupled with controller 240 via one or more communication lines, such as, e.g., signal lines, shared communication busses, or wirelessly.

Controller 240 includes memory and one or more processing devices such as microprocessors, CPUs or the like, such as general or special purpose microprocessors operable to execute programming instructions or micro-control code associated with operation of range appliance 100. The memory can be non-transitory and represent random access memory such as DRAM, or read only memory such as ROM or FLASH. The processor executes programming instructions stored in the memory. The memory can be a separate component from the processor or can be included onboard within the processor. The memory can store information accessible by the processor(s), including instructions that can be executed by the processor(s). For example, the instructions can be software or any set of instructions that when executed by the processor(s), cause the processor(s) to perform operations. For the embodiment depicted, the instructions may include a software package configured to operate the system to, e.g., execute the exemplary methods described below. Alternatively, controller 240 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 240 is also in communication with temperature sensor 250. Temperature sensor 250 is separate from burner assembly 144, and temperature sensor 250 is configured to measure a temperature at a utensil heated by burner assembly 144. Thus, temperature sensor 250 may be a thermistor or thermocouple positioned on and/or disposed within a utensil positioned above burner assembly 144 on cooktop 140. Controller 240 receives temperature measurements from temperature sensor 250. For example, controller 240 and temperature sensor 250 may each include a wireless transmitter/receiver such that controller 240 and temperature sensor 250 communicate with each other wirelessly, e.g., via a Bluetooth® or Wi-Fi® connection. In certain example embodiments, temperature sensor 250 is a separate component mountable to the utensil heated by burner assembly 144. In alternative example embodiments, temperature sensor 250 may be integrated within the utensil heated by burner assembly 144.

According to various embodiments of the present disclosure, the range appliance 100 may be configured for a precision cooking mode and/or methods of operating the range appliance 100 may include precision cooking mode. Precision cooking mode generally includes a closed-loop control algorithm used to automatically (e.g., without user input such as adjusting the primary control valve 220) adjust the flow of gas to one or more of the burner assemblies 144, 146, 148, 150 and griddle burner 160. Utilizing temperature measurements from temperature sensor 250, controller 240 may adjust secondary control valve 230 and regulate the flow of gaseous fuel to, e.g., burner assembly 144. For example, a user may open primary control valve 220 to initiate gaseous fuel flow to burner assembly 144 and light burner assembly 144. In particular, the user may open primary control valve 220 to the "HI" setting in order to maximize the span of regulated gaseous fuel flow rates provided by secondary control valve 230. The user may also turn on the closed loop control system to activate secondary control valve 230. For example, the user may turn on the closed loop control system by initiating precision cooking mode, such as by pressing a corresponding one of the inputs 157 on the user interface 154. Other inputs 157 of the user interface 154 may be used to input a user-defined set temperature or target temperature for the cooking operation.

When the closed loop control system is activated, controller 240 receives the temperature measurements from temperature sensor 250 and compares the temperature measurements to a target temperature, e.g., the user-defined set temperature. In order to reduce a difference between the temperature measurements from temperature sensor 250 and the set temperature, controller 240 adjusts the flow of gaseous fuel to burner assembly 144 with secondary control valve 230. In particular, controller 240 may adjust secondary control valve 230 to decrease the flow of gaseous fuel to burner assembly 144 when the temperature measurements from temperature sensor 250 are greater than the set temperature. Conversely, controller 240 may adjust secondary control valve 230 to increase the flow of gaseous fuel to burner assembly 144 when the temperature measurements from temperature sensor 250 are less than the set temperature. Thus, the heat output provided by burner assembly 144 may be regulated by the closed loop control system, e.g., without additional user input and/or monitoring.

A user may establish the set temperature via a user interface 260, e.g., the user interface 260 may include inputs 157 and a display 155, as in the illustrated example embodiment. Controller 240 is in communication with user interface 260 and is configured to receive the user-determined set temperature from user interface 260. User interface 260 may correspond to user interface panel 154 in certain example embodiments. Thus, the user may, for example, utilize keys 157 on user interface panel 154 to establish the set temperature. In such example embodiments, user interface 260 is positioned on top panel 142 and may be in communication with controller 240 via a wiring harness. As another example, user interface 260 may correspond to an application on a smartphone or other device, and the user may utilize the application to establish the set temperature. In such example embodiments, user interface 260 may be in wireless communication with controller 240, e.g., via a Bluetooth® or Wi-Fi® connection.

Figure 4:
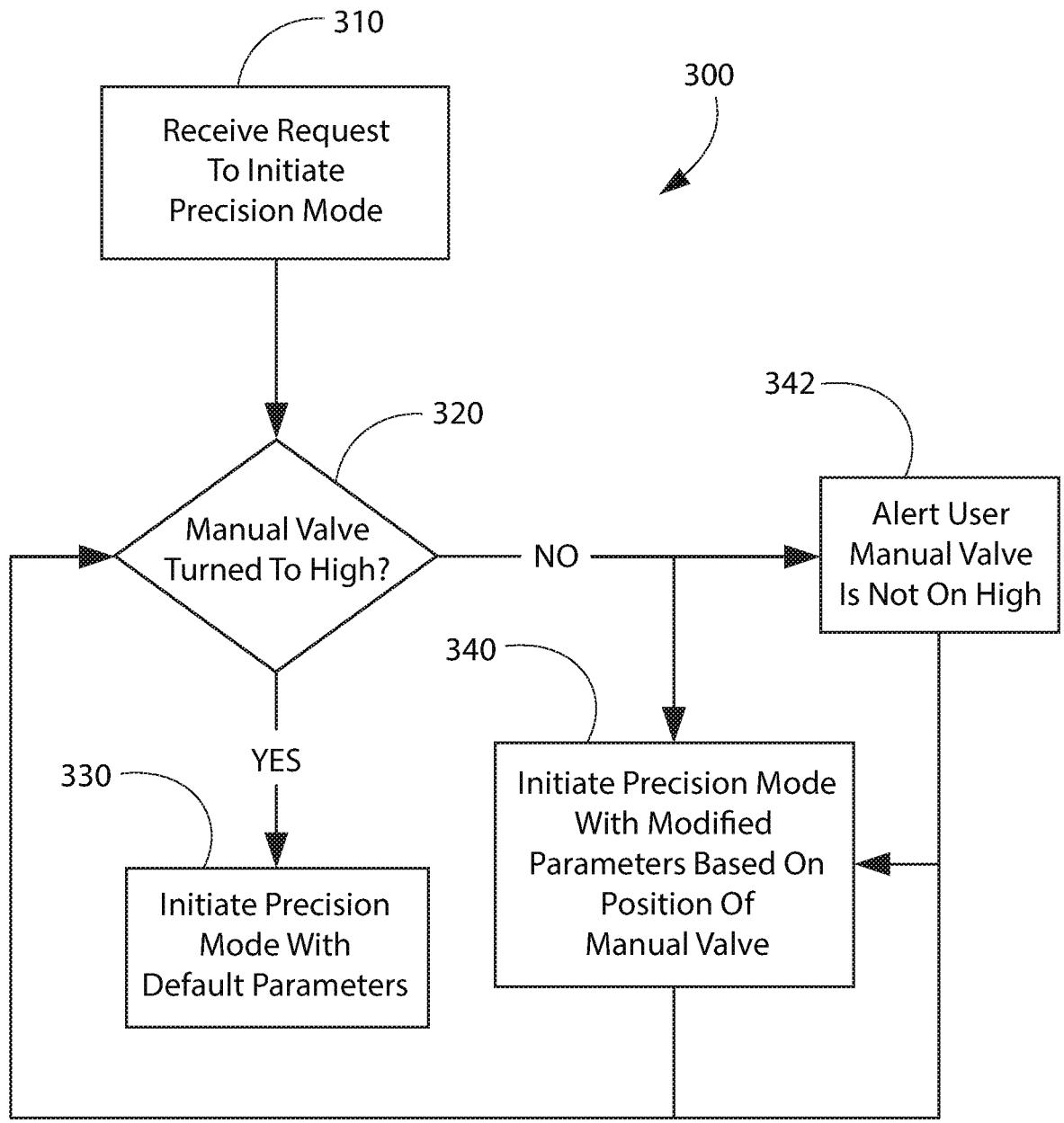
FIG. 4 provides a flow chart illustrating an exemplary method of operating a cooktop appliance according to one or more example embodiments of the present subject matter.

Turning now to FIG. 4, an example method 300 of operating a cooktop appliance, such as the example range appliance 100 described above, is illustrated. The method 300 may include a step 310 of receiving a precision mode initiation signal from the user interface, which may represent or correspond to a user request for precision cooking mode based on a user pressing a precision cooking mode key or button 157 or otherwise entering the request via the user interface 260. It will be understood that the precision cooking mode includes a target temperature, e.g., the method 300 may also include receiving a user-determined set temperature from a user interface, e.g., user interface 260, of the cooktop appliance, and the user interface may include at least one user input and a display. The precision cooking mode utilizes a closed-loop control system, which may operate or adjust the cooktop appliance based on input from the temperature sensor, e.g., the method 300 may also include receiving a temperature measurement from the temperature sensor.

After receiving the precision mode initiation signal at step 310, the method 300 may include determining, at 320, a position of a manually adjustable primary control valve (for example, primary control valve 220 described above) coupled to the gas burner to regulate a flow of gaseous fuel to the gas burner. In particular, the method 300 may include determining whether the position of the manually adjustable primary control valve is a high position or setting. When the primary control valve is set to high, the method 300 may proceed to step 330 and initiate the precision cooking mode with predetermined default parameters, e.g., default PID gains in embodiments where the closed-loop control algorithm is a PID (proportional-integral-derivative) algorithm.

When the primary control valve is not set to high, the method 300 may include one or both of the steps 340 and 342. For example, in some embodiments, the method 300 may proceed to step 340 and initiate precision mode with modified parameters based on the position of the primary control valve directly after determining the position of the primary control valve. Such embodiments may include determining a set of parameters of a closed-loop algorithm for operation of the gas burner corresponding to the determined position of the manually adjustable primary control valve, inputting the user-determined set temperature and the temperature measurement into the closed-loop control algorithm, determining an output of the closed-loop control algorithm using the set of parameters corresponding to the determined position of the manually adjustable primary control valve, and adjusting operation of the gas burner by adjusting a position of the secondary control valve according to the output of the closed-loop control algorithm.

The modified parameters of the closed-loop control algorithm may correspond to the determined position of the manual control valve in that the modified parameters are designed to modify the adjustments to the gas flow made by the control system given the narrower range of possible gas flow rates available to the secondary valve when the primary control valve is not in the high position. Determining the set of parameters corresponding to the determined position of the manually adjustable primary control valve may include selecting a set of parameters from a group of sets of parameters, such as a first, second, and/or third set of parameters each corresponding to a different position of the primary control valve. In some embodiments, the modified parameters may be stored in lookup table, with multiple sets of parameters corresponding to various positions of the primary control valve, such as a first set of modified parameters corresponding to a determined high position of the manually adjustable primary control valve, a second set of parameters corresponding to a medium position of the manually adjustable primary control valve, and a third set of parameters corresponding to a low position of the manually adjustable primary control valve.

In additional embodiments, the method 300 may first proceed to step 342 of alerting a user that the manual valve (i.e., primary control valve) is not on high. For example, the method 300 may include providing a notification to a user prior to initiating precision cooking mode. The notification may be a visual and/or audible notification, and visual notifications may include changing color or intensity of one or more lights and may also or instead include providing a text-based notification, such as displaying text on the display 155 and/or sending a text notification to a remote user interface device, for example but not limited to an SMS or MMS message sent to a smartphone or cellular phone. For example, in some embodiments, the notification may be provided on the display, e.g., display 155 in the illustrated example embodiment, of the user interface. In other embodiments, the notification may be provided on a separate device, e.g., a remote user interface device such as a smartphone, smartwatch, computer, smart home system, etc.

In some embodiments, after alerting the user, the method 300 may then proceed to step 340 and initiate precision mode with modified parameters, as described above. In some embodiments, the method 300 may include waiting a predetermined period of time after alerting the user at step 342 before proceeding to a subsequent step. As mentioned, the directly subsequent step may be step 342. In other embodiments, the method 300 may return to step 320 and again determine whether the manual valve is turned to high after alerting the user at step 342, either immediately after providing the alert, or following a predetermined delay, e.g., to provide the user an opportunity to adjust the manual valve to high in response to the alert.

In embodiments where the method 300 ultimately proceeds to initiate precision mode with modified parameters at step 340, which may be after one or more iterations, e.g., through the loop from 320 to 342 and back to 320 as illustrated in FIG. 4, providing the user alert or notification may include notifying the user that precision mode performance may be limited or impaired due to the reduced range of operation available to the secondary control valve when the manually adjustable primary control valve is not set to high. Such iterations may include, for example, providing the notification, e.g., on the display of the user interface and/or to a remote user interface device, prior to determining the set of parameters of the closed-loop algorithm when the manual valve is not on high at the first iteration of step 320, and determining a second position of the manually adjustable primary control valve (e.g., a second iteration of step 320) following a predetermined time delay after providing the user notification at step 342, and the determined set of parameters of the closed-loop algorithm for operation of the gas burner may correspond to the determined second position (or any suitable number of subsequent iterations, such as a third position, fourth position, etc.) of the manually adjustable primary control valve.

In some embodiments, the modified parameters based on the position of the primary control valve may include at least one set of parameters for disabling precision cooking mode, e.g., when the primary control valve is set to low or simmer. For example, the method may include adjusting the secondary control valve to a fully open position when the determined position of the manually adjustable primary control valve is a simmer position and providing a precision mode disabled notification, e.g., on the display of the user interface and/or to a remote user interface device, when the determined position of the manually adjustable primary control valve is the simmer position.

As may be seen from the above, fuel supply system 200 provides a low cost closed loop gas surface burner control. Adding secondary control valve 230 in series with primary control valve 220 allows controller 240 to adjust gaseous fuel flow to burner assembly 144 in response to temperatures measurements from temperature sensor 250. In such a manner, the temperature of the utensil heated by burner assembly 144 can be precisely controlled without constant monitoring by the user of range appliance 100. Utilizing a traditional knob-actuated primary control valve 220 may preserve the traditional lighting of burner assembly 144 and the normal operation of burner assembly 144 when the closed loop burner control is not in use. It will be understood that while described in the context of one gas burner, fuel supply system 200 may also be used to control multiple gas burners in alternative example embodiments.

Also as may be seen from the above, the present disclosure provides a precision cooking mode, e.g., a closed-loop control system for operation of a cooktop appliance, which includes increased flexibility of operation, including when the primary control valve is not fully open, and cooktop appliances configured to operate according to such methods.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooktop appliance, comprising:
    a user interface comprising at least one user input and a display;
    a gas burner;
    a temperature sensor configured to measure a temperature at a utensil heated by the gas burner;
    a manually adjustable primary control valve coupled to the gas burner to regulate a flow of gaseous fuel to the gas burner;
    a secondary control valve connected in series between the manually adjustable primary control valve and the gas burner; and
    a controller in communication with the temperature sensor and the secondary control valve, the controller configured to:
    receive a user-determined set temperature from the user interface; receive a temperature measurement from the temperature sensor; receive a precision mode initiation signal from the user interface;
    determine a position of the manually adjustable primary control valve after receiving the precision mode initiation signal;
    determine a set of parameters of a closed-loop algorithm for operation of the gas burner corresponding to the determined position of the manually adjustable primary control valve;
    input the user-determined set temperature and the temperature measurement into the closed-loop control algorithm;
    determine an output of the closed-loop control algorithm using the set of parameters corresponding to the determined position of the manually adjustable primary control valve; and
    adjust operation of the gas burner by adjusting a position of the secondary control valve according to the output of the closed-loop control algorithm;
    wherein the closed-loop algorithm comprises comparing the received temperature measurement to the user-determined set temperature and generating the output of the closed-loop algorithm based on the comparison of the received temperature measurement to the user-determined set temperature using the set of parameters of the closed-loop algorithm corresponding to the determined position of the manually adjustable primary control valve.

2. The cooktop appliance of claim 1, wherein the secondary control valve is an electronic pressure regulating valve, a motorized valve, a modulating valve or a solenoid valve.

3. The cooktop appliance of claim 1, wherein the closed-loop control algorithm is a PID control loop.

4. The cooktop appliance of claim 3, wherein the determined set of parameters are PID gains corresponding to the determined position of manually adjustable primary control valve.

5. The cooktop appliance of claim 1, wherein the controller is configured to determine the set of parameters corresponding to the determined position of the manually adjustable primary control valve by selecting from a group comprising a first set of parameters corresponding to a determined high position of the manually adjustable primary control valve and a second set of parameters corresponding to a determined position of the manually adjustable primary control valve other than the high position.

6. The cooktop appliance of claim 5, wherein the second set of parameters corresponds to a medium position of the manually adjustable primary control valve and wherein the group further comprises a third set of parameters corresponding to a low position of the manually adjustable primary control valve.

7. The cooktop appliance of claim 1, wherein the controller is further configured to adjust the secondary control valve to a fully open position when the determined position of the manually adjustable primary control valve is a simmer position, and to provide a precision mode disabled notification when the determined position of the manually adjustable primary control valve is the simmer position.

8. The cooktop appliance of claim 1, wherein the controller is further configured to provide a notification prior to adjusting the position of the secondary control valve when the determined position of the manually adjustable primary control valve is not a high position.

9. The cooktop appliance of claim 8, wherein the controller is configured to provide the notification prior to determining the set of parameters of the closed-loop algorithm, wherein the controller is further configured to determine a second position of the manually adjustable primary control valve following a predetermined time delay after providing the notification and wherein the determined set of parameters of the closed-loop algorithm for operation of the gas burner correspond to the determined second position of the manually adjustable primary control valve.

10. A method of operating a cooktop appliance, the cooktop appliance comprising a gas burner and a temperature sensor configured to measure a temperature at a utensil heated by the gas burner, the method comprising:

receiving a user-determined set temperature from a user interface of the cooktop appliance comprising at least one user input and a display;

receiving a temperature measurement from the temperature sensor;

receiving a precision mode initiation signal from the user interface;

determining a position of a manually adjustable primary control valve coupled to the gas burner to regulate a flow of gaseous fuel to the gas burner after receiving the precision mode initiation signal;

determining a set of parameters of a closed-loop algorithm for operation of the gas burner corresponding to the determined position of the manually adjustable primary control valve;

inputting the user-determined set temperature and the temperature measurement into the closed-loop control algorithm;

determining an output of the closed-loop control algorithm using the set of parameters corresponding to the determined position of the manually adjustable primary control valve; and adjusting operation of the gas burner by adjusting a position of the secondary control valve according to the output of the closed-loop control algorithm;

wherein the closed-loop algorithm comprises comparing the received temperature measurement to the user-determined set temperature and generating the output of the closed-loop algorithm based on the comparison of the received temperature measurement to the user-determined set temperature using the set of parameters of the closed-loop algorithm corresponding to the determined position of the manually adjustable primary control valve.

11. The method of claim 10, wherein the secondary control valve is an electronic pressure regulating valve, a motorized valve, a modulating valve or a solenoid valve.

12. The method of claim 10, wherein the closed-loop control algorithm is a PID control loop.

13. The method of claim 12, wherein the determined set of parameters are PID gains corresponding to the determined position of manually adjustable primary control valve.

14. The method of claim 10, wherein determining the set of parameters corresponding to the determined position of the manually adjustable primary control valve comprises selecting from a group comprising a first set of parameters corresponding to a determined high position of the manually adjustable primary control valve and a second set of parameters corresponding to a determined position of the manually adjustable primary control valve other than the high position.

15. The method of claim 14, wherein the second set of parameters corresponds to a medium position of the manually adjustable primary control valve and wherein the group further comprises a third set of parameters corresponding to a low position of the manually adjustable primary control valve.

16. The method of claim 10, further comprising adjusting the secondary control valve to a fully open position when the determined position of the manually adjustable primary control valve is a simmer position, and providing a precision mode disabled notification when the determined position of the manually adjustable primary control valve is the simmer position.

17. The method of claim 10, further comprising providing a notification prior to adjusting the position of the secondary control valve when the determined position of the manually adjustable primary control valve is not a high position.

18. The method of claim 17, further comprising providing the notification prior to determining the set of parameters of the closed-loop algorithm, and determining a second position of the manually adjustable primary control valve following a predetermined time delay after providing the notification and wherein the determined set of parameters of the closed-loop algorithm for operation of the gas burner correspond to the determined second position of the manually adjustable primary control valve.

* * * * *